United States Patent
Dee

(10) Patent No.: US 9,342,351 B1
(45) Date of Patent: May 17, 2016

(54) SYSTEMS AND METHODS FOR EFFICIENT DB2 OUTAGE OPERATIONS

(71) Applicant: BMC Software, Inc., Houston, TX (US)

(72) Inventor: Stanley James Dee, Austin, TX (US)

(73) Assignee: BMC SOFTWARE, INC., Houston, TX (US)

(*) Notice: Subject to any disclaimer, the term of this patent is extended or adjusted under 35 U.S.C. 154(b) by 173 days.

(21) Appl. No.: 14/069,819

(22) Filed: Nov. 1, 2013

(51) Int. Cl.
- *G06F 7/00* (2006.01)
- *G06F 17/00* (2006.01)
- *G06F 9/46* (2006.01)

(52) U.S. Cl.
CPC .................................. *G06F 9/466* (2013.01)

(58) Field of Classification Search
CPC ..................... G06F 11/1438; G06F 17/30377
USPC ......................................................... 707/703
See application file for complete search history.

(56) References Cited

U.S. PATENT DOCUMENTS

| | | | | |
|---|---|---|---|---|
| 6,334,114 B1* | 12/2001 | Jacobs | ............... | G06Q 30/0633 705/26.8 |
| 2004/0237005 A1* | 11/2004 | Adkisson | ............ | G06F 11/0745 714/55 |
| 2006/0123088 A1* | 6/2006 | Simmons | ............. | G06Q 10/109 709/206 |
| 2006/0259518 A1* | 11/2006 | Lomet | ................. | G06F 11/1474 |
| 2008/0222047 A1* | 9/2008 | Boalt | ..................... | G06Q 20/20 705/67 |
| 2009/0119190 A1* | 5/2009 | Realini | ................... | G06Q 20/04 705/30 |
| 2009/0287739 A1* | 11/2009 | Zhang | ................... | G06Q 10/109 |
| 2013/0066948 A1* | 3/2013 | Colrain | ................. | H04L 67/146 709/203 |
| 2013/0066955 A1* | 3/2013 | Neel | ...................... | H04L 67/146 709/203 |
| 2013/0116843 A1* | 5/2013 | Kim | .................. | G06Q 10/06375 700/292 |
| 2014/0089253 A1* | 3/2014 | Mansur | ................. | G06F 17/303 707/609 |
| 2015/0095289 A1* | 4/2015 | Prabhu | .............. | G06F 17/30073 707/672 |

OTHER PUBLICATIONS

"REORG PLUS for DB2—Reference Manual", BMC Software, Inc., Jun. 2013, 54 pages.

* cited by examiner

*Primary Examiner* — Binh V Ho

(74) *Attorney, Agent, or Firm* — Brake Hughes Bellermann LLP

(57) ABSTRACT

In one aspect, a computer-implemented method provides more efficient outages for databases. The method may include intercepting a database transaction request prior to connection to the database subsystem and determining whether the transaction will finish before an expected drain time for the database object, the transaction being associated with the database object. The method may also include allowing the transaction to proceed when it is determined that the transaction will finish before the expected drain time and suspending the transaction otherwise. The transaction may be associated with the database object in a table so that only transactions associated with the database object are considered for suspension. In another aspect, the method may include determining which transactions running when a drain for the object is initiated and associating the running transactions with the database object in the table.

22 Claims, 4 Drawing Sheets

SYSTEMS AND METHODS FOR EFFICIENT DB2 OUTAGE OPERATIONS

TECHNICAL FIELD

This disclosure relates generally to the field of mainframe software management. More particularly, but not by way of limitation, this disclosure refers to a method of more efficiently handling outage operations for DB2 database systems, such as reorganization or BIND operations.

BACKGROUND

Mainframe computers are large, multi-processor computing devices able to perform thousands of tasks every second. International Business Machine Corporation (IBM) mainframes provide online transaction processing subsystems, such as Information Management System (IMS®), Time Sharing Option (TSO), and Customer Information Control System (CICS®) (IMS and CICS are registered trademarks of IBM), that enable high-speed transaction processing of data. Batch processes also entail transaction processing. Such subsystems often work with a database subsystem, such as the DB2® database from IBM.

Occasionally, the DB2 database may perform operations that require database objects, such as tables, table spaces, indexes, etc., to be taken offline temporarily. For example, changes to the structure of a table generally require that the table be offline for a short period of time to swap a shadow table having the new structure with the table having the old structure. In order to avoid causing transactions against the database to fail while the database is taken offline, some vendors offer an "online" outage process that allows transactions to be quiesced or suspended when the database object is taken offline temporarily. Such a period when the object is offline while transactions are suspended may be referred to as a drain. In order for a drain to be granted there can be no transactions running against the database object and no open protected threads for the database object that is being taken offline.

But problems exist with the current drain methods for online outage processes. First, transactions can come in at high rates. Thus, even if a drain takes 20 seconds, several hundred or even thousands of transactions may be suspended. Furthermore, the waiting transactions are held at the database subsystem and may take up many of the limited connections, or threads, used to process work in the database. Clearing out such a backlog of waiting transactions can take hours.

Another problem arises when threads are protected. Because there are costs associated with setting up a thread for a transaction, some transaction processing subsystems may designate a thread as protected. Protected threads are held open for a specified amount of time after a transaction completes. The protected thread can be associated with a transaction code, among other things. An incoming transaction may be eligible to run on the protected thread if the transaction has compatible properties. Because the thread is already open, the transaction can use the thread without incurring thread set up costs. Database resources held by protected threads are only released when the specified time elapses without a transaction using the thread. While this brings down operating costs absent a database outage, the protected threads may cause a drain request to wait or time out, lengthening the time that transactions are suspended, causing an even bigger backlog of waiting transactions. While currently running transactions may be terminated to prevent a drain request from timing out, this causes the transactions to fail and is disfavored by users.

SUMMARY

Systems and methods are provided to minimize the number of database threads occupied by suspended transactions, decrease the quantity of suspended transactions due to a database drain, and reduce or eliminate the need to cancel currently executing transactions after a drain request. Specifically, the system may prevent transactions from connecting to DB2 if a database outage request is anticipated and the transaction will not finish in time. Because the transaction does not connect to DB2 the transaction does not tie up a database thread, freeing the thread for use by transactions unaffected by the outage. Furthermore, the system may minimize the number of transactions paused by more intelligently pausing transactions.

In one general aspect, a computer-implemented method for efficient database outage operations includes intercepting, within a database client program, a transaction and determining, by at least one processor, whether the transaction is associated with a database object and whether the transaction will finish before an expected drain time for the database object arrives. The method also includes allowing the transaction to proceed when it is determined that the transaction is not associated with the database object or that the transaction will finish before the expected drain time arrives and suspending the transaction prior to assignment of a database connection thread when it is determined that the transaction is associated with the database object and will not finish before the expected drain time arrives.

Implementations can include one or more of the following features. For example, the expected drain time may be determined based on a time that an outage begin request is received from the database and a lead time and/or determining whether the transaction will finish may include retrieving a historical transaction time for the transaction and using the historical transaction time, the current time, and a buffer time to determine whether the transaction will finish. In some implementations, determining whether the transaction will finish can include determining that the transaction is eligible to run on a protected thread, the protected thread holding the database object for a predetermined time after a particular transaction ends and setting the buffer time to a value at least as large as the predetermined time. In some implementations, determining whether the transaction will finish before the expected drain time can include determining whether the transaction is eligible to run on a protected thread, the protected thread holding the database object for a predetermined time after a particular transaction ends and unprotecting the protected thread when it is determined that the transaction is eligible, wherein determining whether the transaction will finish occurs without consideration of the predetermined time. In one implementation determining whether the transaction is associated with the database object in a hash table and allowing the transaction to proceed when it is determined that the transaction is not associated with the database object in the hash table. In such an implementation the method may also include receiving a list of transaction codes for transactions that caused a drain request to wait and associating the transaction codes with the database object in an object/transaction cross-reference table.

In another general aspect, a computer system includes a database subsystem, the database subsystem having at least one database object, at least one processor, and memory storing instructions that, when executed by the at least one processor, cause the computer system to perform operations. The operations may include intercepting a transaction prior to connection to the database subsystem, determining whether the transaction will finish before an expected drain time for a database object, the transaction being associated with the database object, allowing the transaction to proceed when it is determined that the transaction will finish before the expected drain time, and suspending the transaction when it is determined that the transaction will not finish before the expected drain time.

Implementations can include one or more of the following features. For example, the determining is performed after an outage start message for the database object is received from an outage engine and the expected drain time may be determined based on a time that the outage start message is received and a lead time. In some implementations, determining whether the transaction will finish can include determining a historical transaction time for the transaction and using the historical transaction time, the current time, and a buffer time to determine whether the transaction will finish. In some such implementations determining whether the transaction will finish can include determining whether the transaction is eligible to run on a protected thread, the protected thread holding the database object for a predetermined time after a particular transaction ends and using the predetermined time to determine whether the transaction will finish or determining whether the transaction will finish before the expected drain time can include determining whether the transaction is eligible to run on a protected thread, the protected thread holding the database object for a predetermined time after a particular transaction ends and unprotecting the protected thread when it is determined that the transaction is eligible, wherein determining whether the transaction will finish occurs without consideration of the predetermined time.

As another example, the operations may also include determining whether the transaction is associated with the database object in a hash table and allowing the transaction to proceed when it is determined that the transaction is not associated with the database object in the hash table. In some implementations, the operations may also include receiving a list of transaction codes for transactions running when a drain request issued and associating the transaction codes with the database object in the object/transaction cross-reference table. In some implementations the operations may include receiving a list of transaction codes for transactions running when a drain request has waited for a predetermined amount of time; and associating the transaction codes with the database object in the object/transaction cross-reference table. In some implementations, the operations may include receiving at least one transaction code for the database object from a user and associating the at least one transaction code with the database object in the object/transaction cross-reference table.

In another example, the operations can include receiving an outage registration request and, responsive to receiving the outage registration request, providing a lead time to a requestor of the outage registration request. In another example the operations can include receiving an outage registration request and, responsive to receiving the outage registration request, loading transaction codes associated with the database object into a hash table and calculating a suspend start time for each transaction code loaded into the hash table. In such implementations the suspend start time is used to determine whether the transaction will finish before the expected drain time.

In another general aspect, a computer system includes a database subsystem, at least one database client program, at least one processor, and memory storing instructions that, when executed by the at least one processor, cause the computer system to perform operations. The operations may include sending, from an outage engine, a database outage registration message to at least one database client program, the database outage registration message identifying a database object subject to the outage and receiving, at the outage engine, a lead time from the at least one database client program. The operations also include sending an outage start message to the database client program when a drain request is expected within the lead time, the outage start message causing an intercept engine for the database client program to begin intelligently suspending transactions, initiating a drain for the database object, and sending a drain complete message to the database client program when the drain is complete, the drain complete message causing the intercept engine to release the suspended transactions.

In some implementations the operations may also include determining that at least one transaction is running after a drain start request; and sending a transaction code for the transaction to the at least one intercept engine. The intercept engine may associate the transaction code with the database object. In some implementations the at least one intercept engine may suspend the transactions prior to assignment to a connection thread for the database subsystem.

In one general aspect, a computer program product embodied on a computer-readable storage device that does not include transitory propagating signals includes instructions that, when executed by at least one processor, cause a computing device to perform any of the disclosed methods, operations, or processes.

The details of one or more implementations are set forth in the accompanying drawings and the description below. Other features will be apparent from the description and drawings, and from the claims.

DETAILED DESCRIPTION

Figure 1:
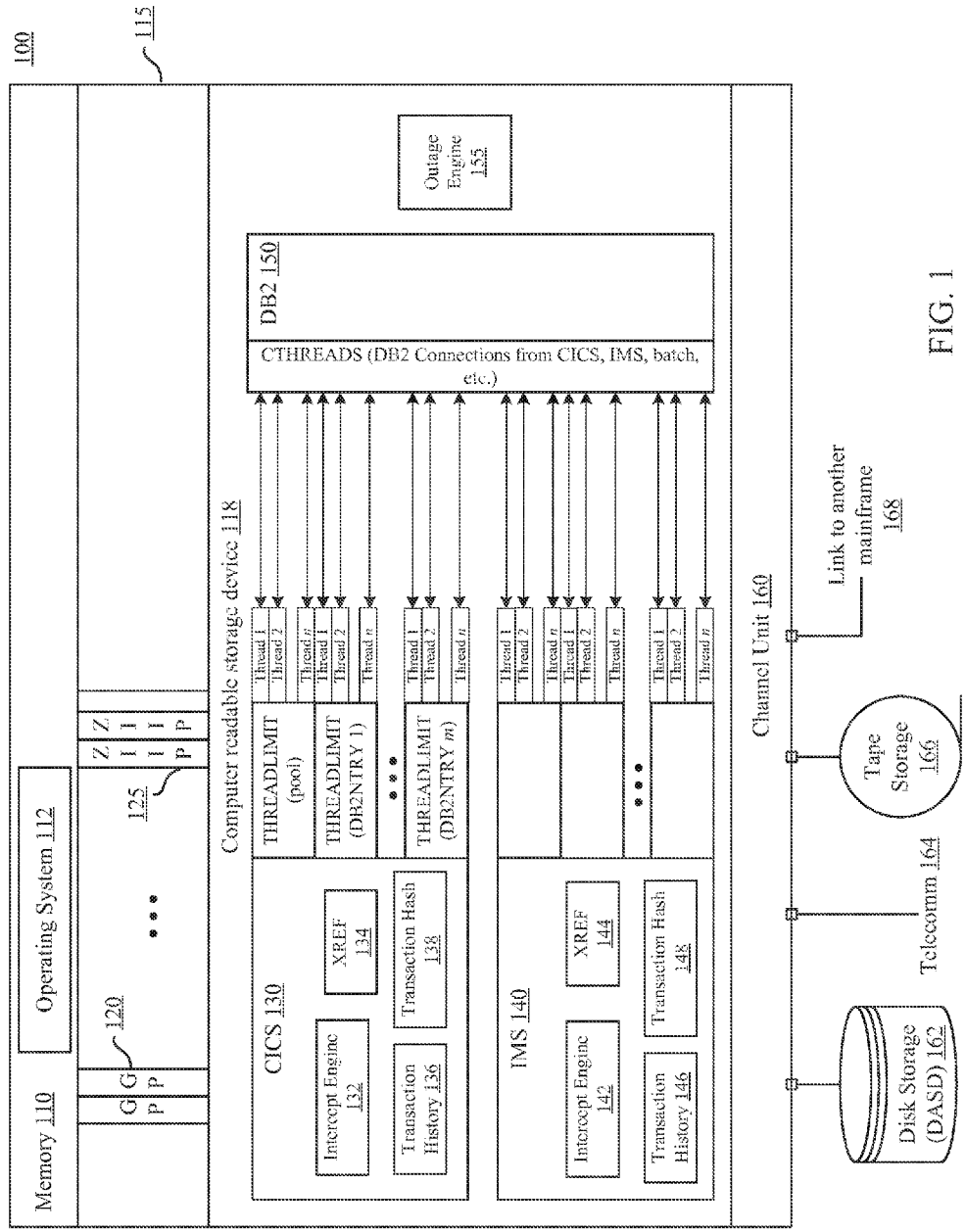
FIG. 1 is a block diagram that illustrates an example of a computing system in accordance with disclosed implementations.

FIG. 1 illustrates a high level block diagram of a computing system 100, for example an IBM zSeries® mainframe computer. (zSeries is a registered trademark of the IBM Corporation.) Mainframe computers are large, multi-processor computing devices able to perform thousands of tasks every second. Because of their large size and processing power, usage of processing time is often tracked and customers are billed based on their processor usage. In some implementations system 100 is an LPAR in a sysplex. An LPAR is a logical segmentation of a mainframe's memory and other resources that allows the LPAR to run its own copy of an operating system and associated applications, making the LPAR, in practice, equivalent to a separate mainframe. Accordingly, processing may be billed separately for each LPAR, depending on its configuration. LPARs may be enabled via special hardware circuits or purely through software. A system administrator can assign one or more processors for the exclusive use of an LPAR. Alternately, the administrator can allow all processors to be used on some or all LPARs. LPARs may also allow multiple system images (of the same operating system or different operating systems) to run in one machine. Furthermore, each LPAR can execute one or more subsystems within an operating system. A sysplex is a collection of LPARs that cooperate to process work. Processes running on LPARs in a sysplex can communicate with each other without a subsystem (e.g., CICS, IMS, DB2, etc.) control region using Cross-system Coupling Facility ("XCF") communications. Although shown in FIG. 1 as an IBM zSeries® mainframe, implementations are not so limited. Thus, although referred to as mainframe computing system 100, it is to be understood that mainframe computing system 100 may be a logical partition of a single physical mainframe computer.

The mainframe computing system 100 can include one or more processors in processor frame 115 capable of executing one or more machine executable instructions or pieces of software, firmware, or a combination thereof. The processor frame 115 may include a plurality of General Processors (GPs) 120 and may include a plurality of other processors such as System z Integrated Information Processors (zIIPs) 125, System z Application Assist Processors (zAAPs) (not shown) etc. The GPs 120 may be available to run all workloads while the operating system 112 may only run certain workloads on the other processors, such as zIIPs 125. The mainframe computing system 100 may also include one or more computer readable storage devices, such as device 118. The computer readable storage device 118 may include main memory, cache, or disk storage, configured to store data and/or applications, either temporarily, permanently, semi-permanently, or a combination thereof. The storage device 118 may include volatile memory, non-volatile memory, or a combination thereof.

The mainframe computing system 100 can include an operating system, such as operating system 112. The operating system can be the z/OS operating system or some other mainframe operating system. The mainframe computing system 100 may include one or more database client programs that execute on the mainframe computing system 100. Database client programs include any program that connects with, communicates with, or requests transactions from a database subsystem. A transaction is a series of related operations or computer commands that are executed or rolled back as a whole. A database client program may handle the assignment of system resources to execute the transactions, such as assigning threads, control blocks, scheduling the transaction for execution, and connecting to and communicating with the DB2 subsystem. For example, a database client program may include mainframe subsystems, such as CICS, IMS, and the distributed subsystem which is part of the DB2 product. Although CICS 130 and IMS 140 are illustrated in FIG. 1 as examples of database client programs, it is understood that mainframe computing system 100 may include several instances of CICS, IMS, or other database client programs that handle DB2 transactions. A database client program includes a batch program or any other program or subsystem that connects to a database subsystem to retrieve or update data.

The database client programs may have an intercept engine, such as intercept engine 132 for CICS 130 and intercept engine 142 for IMS 140. The intercept engine 132 may gather information that enables it to intelligently suspend database transactions so that any database outage time is reduced. For example, the intercept engine may track the completion time of transactions running in CICS 130 in a transaction history 136. The transaction history 136 may track the minimum, maximum, and/or mean or average time for each type of transaction to finish. The transaction history may be stored in disk, flash, or main memory. Transaction types may be based on transaction codes, as is known. In some implementations, the intercept engine 132 may use a history compiled by another engine or product. For example, system 100 may be running the MAINVIEW product for CICS (MAINVIEW is a registered trademark of BMC Software) or another product that tracks transaction histories, and the transaction history 136 may be generated by that product with intercept engine 132 using the generated history. A transaction history may be kept for each transaction management subsystem, so that CICS 130 has one transaction history 136 and IMS 140 has another transaction history 146.

The transaction management subsystems may also have a transaction hash, such as transaction hash 138 for CICS 130 and transaction hash 148 for IMS 140. The transaction hash 138 or 148 may be a hash table kept in main memory for fast lookup. In some implementations, the transaction hash 138 may be loaded from slower-access memory into main memory when the intercept engine 132 is loaded. The transaction hash 138 or 148 may be keyed by transaction code. The transaction management subsystems may also include an object/transaction cross-reference, such as XREF 134 and XREF 144. The object/transaction cross-reference data store may indicate which transactions are associated with particular database objects. A database object is a table space or index, used to store or reference data in the database. The data base objects are capable of being the object of a database outage process, such as a reorganization or BIND. In other words, a database administrator may determine that an outage of the database is needed to change, add, or delete a database object. The object/transaction cross-reference 134 may be maintained by the intercept engine 132. For example, the intercept engine 132 may include a user interface that allows a user to provide database objects and corresponding transaction codes that are to be suspended when an outage involving the database object occurs. The intercept engine 132 may also automatically populate the object/transaction cross-reference 134 based on data received from an outage engine for the database subsystem. For example, the intercept engine 132 may work with the outage engine 155 to determine which transactions to suspend for an outage of a particular database object, as will be explained in more detail below with regard to FIG. 3.

Transaction management subsystems, such as CICS, IMS, batch programs, etc., may have parameters that constrain the amount of resources used by the subsystems. Database subsystems, such as DB2 150, may also have such parameters. For example, DB2 150 may have a CTHREADS parameter that sets a maximum quantity of active threads connected to DB2 at any time, excluding threads allocated to distributed work. This applies to threads from all allied subsystems, which may include multiple CICS regions, IMS, batch processes, etc. Thus, if DB2 150 pauses a transaction on one of the threads it blocks other subsystems from using the connection until the paused transaction completes. CICS also includes a MAXOPENTCBS parameter, which limits the total number of TCBs open in the subsystem. A THREADLIMIT parameter further limits the number of threads connected to DB2. IMS and other transaction processing subsystems may have similar parameters. A thread is a type of control block needed to maintain status of a request to DB2. A "control block" or just "block" is a memory structure that stores data about a specific entity and has addresses, or pointers, to still other blocks. Once a transaction is assigned a thread, the transaction is using one of the threads that can be open and holds that slot until the transaction is complete. Accordingly, intercept engine 132 (and 142) may intercept a transaction request before a thread is assigned to the transaction when the intercept engine determines that transaction may not complete before a drain is requested. Intercepting the transaction before a thread is assigned minimizes the impact of an outage to DB2 throughput by keeping threads open for transactions that are not affected by the outage.

The mainframe computing system 100 may also include a database subsystem, such as DB2 150. Mainframe computing system 100 may also include an outage engine 155. The outage engine 155 may be a utility that runs as a batch program that accomplishes online outages of the database. The outage engine 155 may be, for example, a reorganization utility used to improve performance of the database by, for example, defragmenting the disks or accomplishing schema changes. The outage engine 155 may also be a BIND command or Data Definition Language (DDL) in SQL, both of which have outage profiles similar to an online reorganization. Although not shown in FIG. 1, in some implementations the outage engine 155 may be part of the database subsystem. The outage engine 155 may be capable of communicating with one or more intercept engines. In the example of FIG. 1, the outage engine 155 may send messages to and receives messages from one or more of intercept engines 132 and 142 to more efficiently accomplish the online outage. Such messages may tell intercept engine 132 which database object will be affected by a drain (e.g. a temporary outage), and when the drain is anticipated to begin. The outage engine 155 may also tell intercept engine 132 which transactions are holding up a drain request and notify intercept engine 132 when the outage is complete. Of course, outage engine 155 may also handle a BIND request, a DDL request, or some other operation that requires a temporary outage of a database object. In some implementations, the outage engine 155 may be a batch program. For example, the batch program may pass information to populate the object/transaction cross-reference so that a process, such as a batch program with a DDL request has minimal impact on the mainframe.

In some implementations, the mainframe computer 100 may also include a channel unit 160 for processing Input/Output (I/O) requests, a connection to another mainframe 168 (which may be a network interface or some other communication link such as a communication bus), a tape storage unit 166, a telecommunications link 164 and a disk storage device 162 sometimes referred to as a Direct Access Storage Device (DASD). In some implementations, mainframe computer 100 may include one or more other hardware components not shown in FIG. 1, such as for example, a display or monitor, a keyboard, a touchscreen, a camera, a mouse, a touchpad, a trackpad, a video processor, etc., through which a user may send data to and receive data from mainframe computer 100. In some implementations, the user may use a second computing device (not shown) in communication with mainframe computer 100 via a communications network to send data to and receive data from mainframe computer 100.

Figure 2:
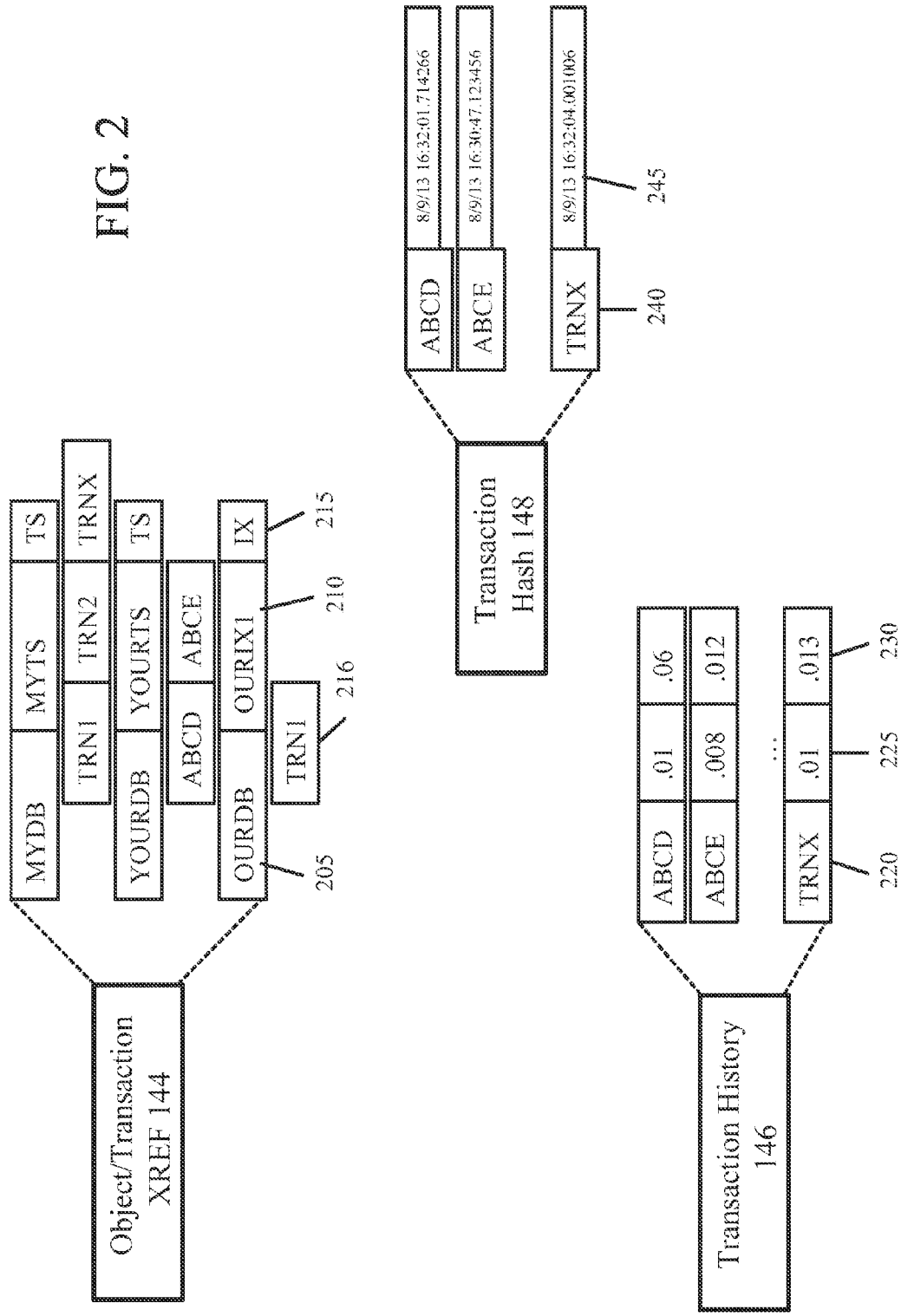
FIG. 2 is a block diagram illustrating an example transaction hash, according to an implementation.

FIG. 2 is a block diagram illustrating an example of an object/transaction cross-reference 144 and a transaction hash 148, according to an implementation. The object/transaction cross-reference 144 may be a table that allows an intercept engine, such as intercept engine 132 or 142 of FIG. 1, to look up which transactions are affected by a temporary outage of a particular database object. As illustrated in FIG. 2, the object/transaction cross-reference 144 may be keyed by database name 205, object (e.g., table or index) name 210, and object type 215 and map to one or more transaction codes, such as transaction code 216. Thus, the object/transaction cross-reference 144 maps database objects to one or more transaction codes. A transaction code may also be mapped to several different database objects in the object-transaction cross-reference 144. A copy of the object/transaction cross-reference 144 may be stored in non-volatile memory in addition to a copy stored in volatile memory.

The transaction hash 148 may be a hash table also stored in main memory that allows an intercept engine to quickly determine which transactions are affected by a drain request. The transaction hash 148 may include a suspend start time 245 for each transaction code 240. The suspend start time 245 may represent the time at which transactions of the type specified by the transaction code 240 will be suspended. The suspend start time 245 may be loaded into the hash when an outage becomes active. In some implementations, the suspend start time may be based on a maximum or mean time from a transaction history table and a buffer time that represents the time to maintain thread protection and the current time when the entry is added. In some implementations, when an intercept engine receives notification of an outage for a particular database object, the intercept engine may populate the suspend start time 245 for transaction codes 240 in the transaction hash 148 as described below with regard to FIG. 3.

The transaction history 146 may include, among other things, at least a maximum transaction time 230 and/or a mean transaction time 225 for each transaction code 220. As indicated above, this history may be collected and maintained by another program or module already running in the subsystem, such as MAINVIEW, or the history may be collected and maintained by the intercept engine. In some implementations the maximum transaction time 230 may represent the maximum over a period of time after discarding outliers. The mean transaction time 225 may represent that mean over a period of time after discarding outliers. In some implementations, mean and maximum times may be collected over multiple time periods.

The transaction hash may exist in slower-access memory (e.g., disk, flash) until the intercept engine receives an outage registration message. When the intercept engine receives an outage registration message it may load the transaction hash 148 into main memory for faster access, which minimizes the overhead of the intercept engine. In some implementations, only the rows of the transaction hash that apply to the database object identified in the outage registration message may be loaded into main memory. For example, the intercept engine may use object/transaction cross-reference 144 to determine which transactions to load into main memory. In some implementations, the version of the transaction hash in slower-access memory may not include the historical transaction time 245 but a calculated time may be added to the transaction hash 148 from transaction history 146 when the hash is loaded into main memory. As used herein, transaction hash or hash table refers to the version stored in slower access memory or the version stored in main memory.

Figure 3:
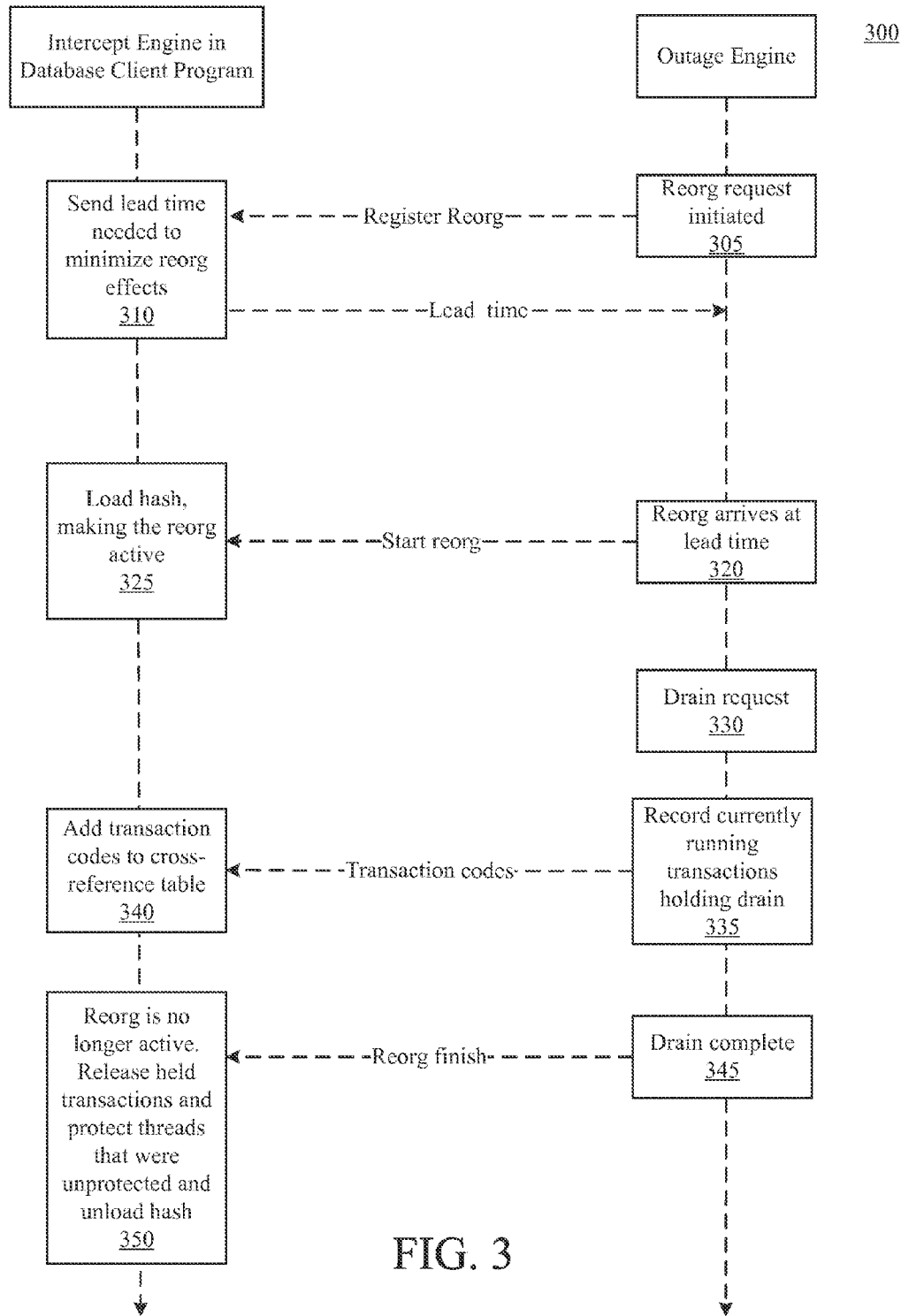
FIG. 3 is a flowchart illustrating an example process for efficient database outages, according to an implementation.

FIG. 3 is a flowchart illustrating an example process 300 for efficient database outages, according to an implementation. In one implementation, process 300 may be invoked by a system administrator of a mainframe, such as mainframe 100 shown in FIG. 1. The system administrator may initiate an outage request using the outage engine through, for example, a reorganization request, a BIND request, or DDL, among others. The system administrator may also load and start the intercept engine on an affected database client program. In some implementations, the intercept engine may always be running (e.g., started when the subsystem starts), and in some implementations, the system administrator may load and start the intercept engine prior to initiating an outage. Process 300 assumes that the intercept engine is running. While the example of FIG. 3 uses an online reorganization as the outage event, it is understood that the mainframe system may use process 300 for any kind of planned, temporary database outage. Furthermore, while FIG. 3 illustrates one intercept engine for the sake of brevity, it is understood that multiple intercept engines for various transaction processing subsystems may be involved.

The outage engine may receive instructions for an online reorganization, which may include the database object affected by the reorg. The outage engine may begin to make a shadow database, as is known, but may also send an outage registration message to one or more intercept engines running in one or more database client programs (305). The message may register the outage with the intercept engine. When the intercept engine receives the outage registration message, it may send a lead time to the outage engine (310). The lead time may be dependent on the type of subsystem and the configuration of the subsystem. In some implementations, the lead time may be a parameter provided to the intercept engine when it is started. In some implementations, the lead time may be stored in a table and may be dependent on the database object that is the subject of the outage. The lead time may also depend on whether the subsystem uses protected threads. As explained above, a protected thread holds database resources (objects) for a predetermined amount of time after a transaction has finished. If the subsystem uses protected threads the lead time may be at least the predetermined amount of time so that transactions using a protected thread can finish before the intercept engine begins holding transactions. If the subsystem does not use protected threads, the lead time may be based on the maximum transaction time for all transaction codes in the transaction history. In any implementation, the lead time should represent a time that minimizes drain wait time while also minimizing the number of held transactions. In other words, the lead time should represent the shortest time that is long enough for the intercept engine to catch transactions that might be running when the outage engine issues the drain request. In some implementations, the intercept engine may adjust the lead time in response to transactions that hold up a drain request or a determination that more transactions were held than necessary.

The outage engine receives the lead time requested by the intercept engine. Of course, although not shown in FIG. 3, the outage engine may receive several lead times from several different intercept engines and may track the lead times separately. The outage engine may perform operations in preparation for the outage. For example, the outage engine may create a shadow table and begin populating the shadow table with data from the live table, as is known. When the outage engine determines that it has reached the lead time requested by the intercept engine, it may send a message to the intercept engine that the outage is active (320). For example, the intercept engine may have told the outage engine that 30 seconds of lead time is desired. When the outage engine determines that it will issue a drain request in approximately 30 seconds, the outage engine may tell the intercept engine to begin intelligently holding transactions. For example, the outage engine may send an outage start message to the intercept engine. The intercept engine may receive this message and note that the outage is active (325). In some implementations, to make the outage active the intercept engine may load the transaction hash table and calculate a suspend start time for each transaction in the transaction hash. For example, the intercept engine may load transactions associated with the database object (or objects) identified by the outage registration request from the object/transaction cross-reference into the transaction hash. This enables the intercept engine to quickly determine what time to start suspending each transaction. For example, transaction that run quickly can be allowed to complete much closer to an anticipated drain than transactions that take longer to run. Thus, the intercept engine may intelligently hold transactions to maximize transaction throughput while minimizing drain wait time and, thus, overall outage time.

In some implementations, the intercept engine may calculate the suspend start time based on entries in the object/transaction cross-reference and a transaction history. The suspend start time may be based a buffer time and a historical transaction time. The buffer time may be a parameter set up by the system administrator for the transaction management subsystem. For example the buffer time may be one second. Thus, the intercept engine may begin suspending transactions that would not finish one second prior to the time the drain is expected to be requested. The intercept engine may add this buffer time to a historical transaction time. At this point, the intercept engine has calculated an offset to be subtracted from an expected drain time. The expected drain time can be sent by the outage engine as part of the message indicating the outage is active, or can be calculated based on the lead time provided to the outage engine.

This offset may be subtracted from the time the drain is expected to be requested, which represents an approximation of when the drain will actually be requested. The expected drain time may be determined by the lead time the intercept engine provided the outage engine, as described above, added to the time that the reorganization became active (e.g. when the message was received), or may be provided by the outage engine. The transaction history time and buffer time, e.g. the offset, may be subtracted from the expected drain time, resulting in the suspend start time for each transaction. This time may be stored in the transaction hash for faster access, although the suspend start time may be stored elsewhere. The suspend start time may be stored in a format that allows a simple timestamp comparison to the current time to determine when to start suspending a particular transaction. Once the hash table is loaded with suspend start times, the outage may be considered active. Of course, other methods of making the outage active may also be used, such as the use of a flag. In addition in some implementations the intercept engine may begin pre-loading transactions into the hash table and calculating the offset after receiving the registration message (310). In such implementations, the intercept engine may finish calculating the suspend start time after receiving the message indicating the outage is active. Once the outage is active the intercept engine may begin intelligently holding transactions, as described in more detail below with regard to FIG. 4.

At some point in time after sending the message to make the outage active, the outage engine may issue a drain request (330). The drain request allows currently processing transactions to finish but holds any incoming transactions for the object of the drain. Ideally, there are no transactions currently processing for the object of the outage when the outage engine issues the drain request and the database object may be taken offline immediately. But if there are currently processing transactions or open protected threads, the outage engine may record the transaction codes of currently processing transactions or open protected threads that are holding up the drain (335). These transactions may be sent to support code in the intercept engine, which may add the transaction codes to the object/transaction cross-reference table for the database object (340). In some implementations, the transaction codes may be added to the cross-reference table after the drain is complete and the outage is no longer active. In this way the intercept engine may learn which transactions to hold for each database object. In some implementations, the outage engine may only report transaction codes that caused the drain request to time out.

Once the database object is back online, the outage engine may send a drain complete message to the intercept engine (345). After receiving the outage complete message, the intercept engine may release any held transactions and may protect any threads that were unprotected (350), as will be described in more detail below. The intercept engine may also unload the entries in the hash table. This may be an indication that the outage is no longer active. In other implementations, the intercept engine may unset a flag, etc. to indicate the outage is no longer active. The intercept engine may continue to execute or may be terminated by a system administrator, and process 300 ends.

Process 300 differs from conventional online outage processes in several ways. First, process 300 results in far fewer transactions being suspended, reducing the backlog of transactions that accrue behind the drain request. This is because the intercept engine intelligently suspends transactions, allowing transactions to run until it is likely that they will interfere with a drain request. Second, process 300 prevents held transactions from tying up threads that could be used to process other database requests unaffected by the outage, maximizing overall transaction throughput. Third, process 300 minimizes the effect of protected threads on temporary outages while still taking advantage of the cost savings associated with protected threads. In other words, the transaction customer need not unprotect all threads when an outage is anticipated just to ensure that the protected threads do not interfere with the drain request. Finally, process 300 minimizes or even eliminates failed transactions that were canceled because they were preventing a drain to proceed.

Figure 4:
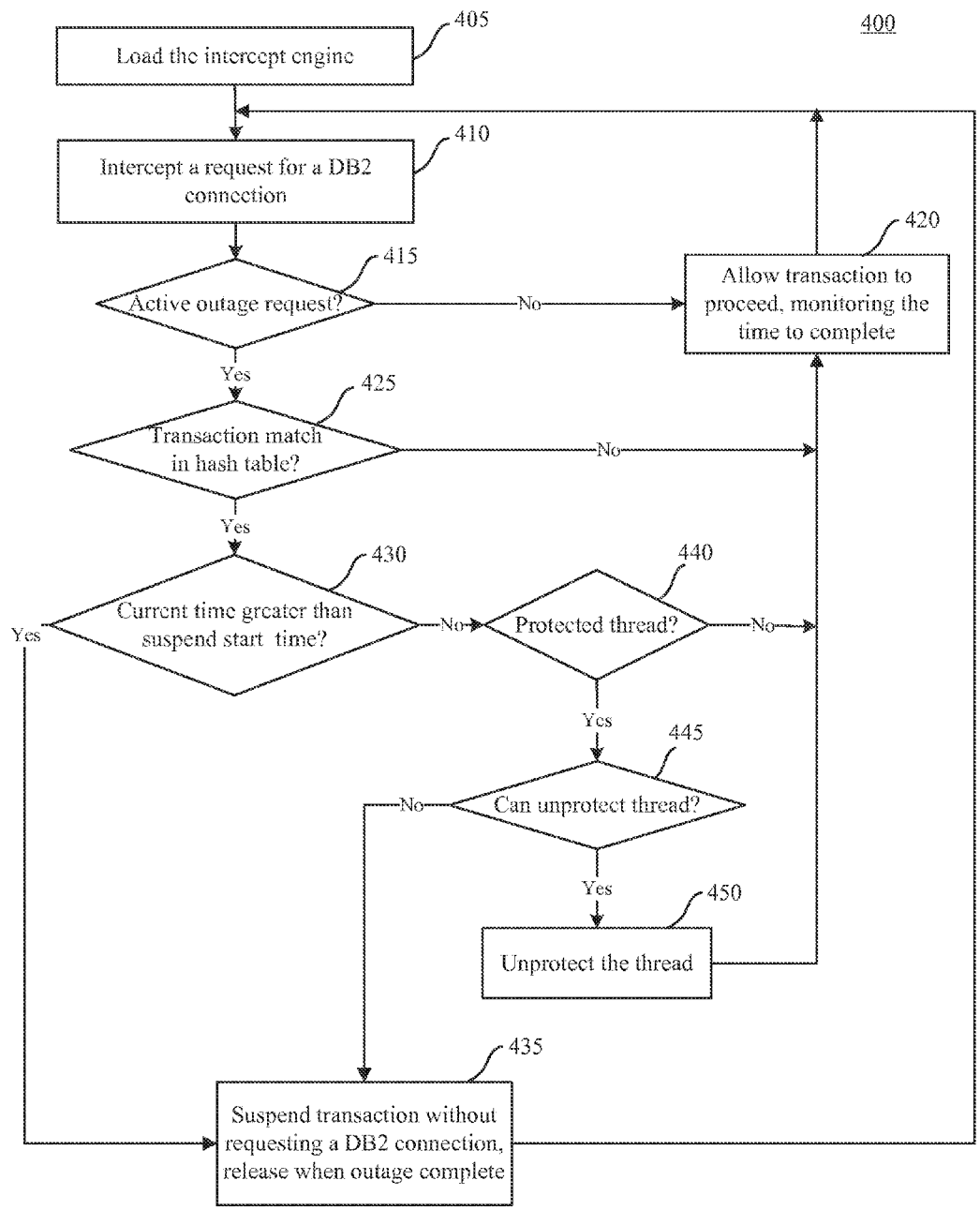
FIG. 4 is a flowchart illustrating an example process for intelligent suspension of database transactions, according to an implementation.

FIG. 4 is a flowchart illustrating an example process 400 for intelligent suspension of database transactions, according to an implementation. Process 400 may be implemented by an intercept engine, such as intercept engine 132 or 142 of FIG. 1. In the example of FIG. 4 the outage is described as an online reorganization process. However, it is understood that this is only one type of outage that can be optimized using the method illustrated in FIG. 4. The intercept engine may perform process 400 as part of a more efficient database outage process, such as an online reorganization or a BIND. At block 405 the intercept engine is loaded. This may be in response to a command provided by a system administrator in preparation for a database outage operation or the intercept engine may be loaded upon start-up of the subsystem with which it is associated. When loaded the intercept engine may intercept a transaction request for a DB2 connection (410). To intercept a transaction request, for example, a mainframe administrator may replace the connection and SQL call APIs (e.g. DSNAPRH for DB2) with a reference to the intercept engine. Replacing the connection may involve intercepting a LOAD SVC and replacing the intercept engine as proxy for the database API. Another method of intercepting the database API calls can be concatenating a library for the intercept engine in the execution sequence for the subsystem region, for example CICS, IMS, etc. The execution sequence may be specified in a configuration file for the subsystem or in Job Control Language (JCL). In one implementation for DB2, the intercept engine may generate a function request block (FRB) and call DSNAPRH after setting the FRBRALE and FRBFVLE fields appropriately. The FRBRALE is a half-word at offset 0004 of the FRB block and describes the family of the call. The FRBFVLE field is a half-word at offset 0006 and provides more information about the call within the family.

The intercept engine may then determine if there is an active outage request (415). As explained above with regard to FIG. 3, an active outage request may be issued by an outage engine at a predetermined time before a drain is requested. If there is no active outage request (415, No), the intercept engine may allow the transaction to proceed normally (420). In some implementations, the intercept engine may also monitor the time it takes the transaction to complete. This information may be used to determine a historical transaction time. In some implementations, the monitoring may be performed by another engine or utility running in the subsystem, such as MAINVIEW.

If there is an active outage request (415, Yes), the intercept engine may determine if there is a matching entry in the transaction hash (425). A matching entry is an entry that matches the transaction code of the transaction request. If no match is found (425, No), the intercept engine may allow the transaction to proceed (420), as described above. If the hash table does include a matching entry (425, Yes), the intercept engine may determine whether it is time to hold the transaction (430). The intercept engine may determine whether it is time to hold the transaction by, for example, determining whether the current time is greater than or equal to the suspend start time for this transaction code. The suspend start time may be determined as described above with regard to step 325 of FIG. 3. In an alternate implementation, the suspend start time may be calculated at comparison time. If it is time to hold a transaction (430, Yes), the intercept engine may suspend the transaction (435). When the intercept engine holds or suspends the transaction, it does so before a DB2 connection is requested, freeing system resources for transactions unaffected by the pending outage request. As explained above with regard to FIG. 3, the intercept engine may release or un-suspend the transaction request once the drain is finished and the reorganization is complete.

If it is not time to hold the transaction (430, No), the intercept engine may determine whether the transaction is eligible to run on a protected thread (440). As previously discussed, a protected thread is a thread that can be reused by similar tractions so that the costs for thread startup are saved. Such threads are held open for a predetermined amount of time after a transactions finishes. In CICS the predetermined time period is defined by the PURGECYCLE parameter and threads are protected when a DB2 package is bound with RELEASE(DEALLOCATE). If an incoming transaction matches the parameters for a protected thread, such as transaction code, database object, security, etc., the incoming transaction may use the protected thread. This means that the resources, e.g., the database object, will be locked for at least the predetermined time plus the transaction time.

If the transaction is not eligible to run on a protected thread (440, No), the intersect engine may allow the transaction to proceed (420), as described above. If the transaction is eligible to run on a protected thread (440, Yes), the intercept engine may optionally determine whether the thread may be temporarily unprotected (445). In some implementations, no threads may be unprotected and the intercept engine may proceed directly to block 455. In some implementations, all protected threads may be unprotected and the intercept engine may proceed directly to block 450. If the thread can be unprotected (445, Yes), the intercept engine may unprotect the thread (450). For example, the intercept engine may adjust a flag in the DB2NTRY row in CICS or temporarily change the package parameter from RELEASE(DEALLOCATE) to RELEASE(COMMIT) in memory. The intercept engine may then allow the transaction to proceed (420), as described above. Because the intercept engine unprotects the thread, the transaction can be allowed to proceed up until the suspend start time without making the drain wait. Furthermore, by only selectively unprotecting threads, i.e., unprotecting only those that may adversely affect the drain of the current reorganization or other outage, the intercept engine maximizes cost savings achieved by allowing other transactions to continue running on protected threads that do not affect the pending outage. However, if the thread cannot be unprotected (445, No), the intercept engine may suspend the transaction (435), as explained above to ensure that no threads are open when the drain request is issued.

As illustrated in FIG. 4, the intercept engine may intelligently suspend incoming transactions to minimize the number of suspended transactions before a drain request. The intercept engine also intelligently suspends transactions that may not finish before the expected drain time, which allows the drain request to fail less often, minimizing the outage time and, thus, the number of suspended transactions. Furthermore, the intercept engine allows transactions to be suspended before allocation of system resources such as a database connection thread, so that the resources can be used to service other transactions.

Implementations of the various techniques described herein may be implemented in digital electronic circuitry, or in computer hardware, firmware, software, or in combinations of them. Implementations may implemented as a computer program product, i.e., a non-transitory computer program tangibly embodied in a machine-readable storage device that does not include transitory propagating signals (e.g., a tangible computer-readable medium), for processing by, or to control the operation of, data processing apparatus, e.g., a programmable processor, a computer, or multiple computers. In some implementations, a computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers, such as a storage device, suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer system for reduced database outage time comprising:
    a database subsystem, the database subsystem having at least one database object;
    at least one processor; and
    a memory storing instructions that, when executed by the at least one processor, cause the computer system to perform operations including:
        intercepting a transaction prior to connection to the database subsystem,
        determining whether the transaction will finish before an expected drain time for a database object, the transaction being associated with the database object,
        allowing the transaction to proceed when it is determined that the transaction will finish before the expected drain time, and
        suspending the transaction when it is determined that the transaction will not finish before the expected drain time.

2. The system of claim 1, wherein the determining is performed after an outage start message for the database object is received from an outage engine.

3. The system of claim 2, wherein the expected drain time is determined based on a time that the outage start message is received and a lead time.

4. The system of claim 1, wherein determining whether the transaction will finish includes:
   determining a historical transaction time for the transaction; and
   using the historical transaction time, the current time, and a buffer time to determine whether the transaction will finish.

5. The system of claim 4, wherein determining whether the transaction will finish includes:
   determining whether the transaction is eligible to run on a protected thread, the protected thread holding the database object for a predetermined time after a particular transaction ends; and
   using the predetermined time to determine whether the transaction will finish.

6. The system of claim 4, wherein determining whether the transaction will finish before the expected drain time includes:
   determining whether the transaction is eligible to run on a protected thread, the protected thread holding the database object for a predetermined time after a particular transaction ends; and
   unprotecting the protected thread when it is determined that the transaction is eligible, wherein determining whether the transaction will finish occurs without consideration of the predetermined time.

7. The system of claim 1, wherein the memory stores instructions that, when executed by the at least one processor, further cause the computer system to perform operations including:
   determining whether the transaction is associated with the database object in a hash table; and
   allowing the transaction to proceed when it is determined that the transaction is not associated with the database object in the hash table.

8. The system of claim 7, wherein the memory stores instructions that, when executed by the at least one processor, further cause the computer system to perform operations including:
   receiving a list of transaction codes for transactions running when a drain request issued; and
   associating the transaction codes with the database object in an object/transaction cross-reference table.

9. The system of claim 7, wherein the memory stores instructions that, when executed by the at least one processor, further cause the computer system to perform operations including:
   receiving a list of transaction codes for transactions running when a drain request has waited for a predetermined amount of time; and
   associating the transaction codes with the database object in an object/transaction cross-reference table.

10. The system of claim 7, wherein the memory stores instructions that, when executed by the at least one processor, further cause the computer system to perform operations including:
    receiving at least one transaction code for the database object from a user; and
    associating the at least one transaction code with the database object in an object/transaction cross-reference table.

11. The system of claim 1, wherein the memory stores instructions that, when executed by the at least one processor, further cause the computer system to perform operations including:
    receiving an outage registration request; and
    responsive to receiving the outage registration request, providing a lead time to a requestor of the outage registration request.

12. The system of claim 1, wherein the memory stores instructions that, when executed by the at least one processor, further cause the computer system to perform operations including:
    receiving an outage registration request; and
    responsive to receiving the outage registration request, loading transaction codes associated with the database object into a hash table and calculating a suspend start time for each transaction code loaded into the hash table,
    wherein the suspend start time is used to determine whether the transaction will finish before the expected drain time.

13. A method for efficient database outage operations, the method comprising:
    intercepting, within a database client program, a transaction;
    determining, by at least one processor, whether the transaction is associated with a database object and whether the transaction will finish before an expected drain time for the database object arrives;
    allowing the transaction to proceed when it is determined that the transaction is not associated with the database object or that the transaction will finish before the expected drain time arrives; and
    suspending the transaction prior to assignment of a database connection thread when it is determined that the transaction is associated with the database object and will not finish before the expected drain time arrives.

14. The method of claim 13, wherein the expected drain time is determined based on a time that an outage begin request is received from the database and a lead time.

15. The method of claim 13, wherein determining whether the transaction will finish includes:
    retrieving a historical transaction time for the transaction; and
    using the historical transaction time, the current time, and a buffer time to determine whether the transaction will finish.

16. The method of claim 15, wherein determining whether the transaction will finish includes:
    determining that the transaction is eligible to run on a protected thread, the protected thread holding the database object for a predetermined time after a particular transaction ends; and
    setting the buffer time to a value at least as large as the predetermined time.

17. The method of claim 15, wherein determining whether the transaction will finish before the expected drain time includes:
    determining whether the transaction is eligible to run on a protected thread, the protected thread holding the database object for a predetermined time after a particular transaction ends; and
    unprotecting the protected thread when it is determined that the transaction is eligible, wherein determining whether the transaction will finish occurs without consideration of the predetermined time.

18. The method of claim 13, further comprising:
determining whether the transaction is associated with the database object in a hash table; and
allowing the transaction to proceed when it is determined that the transaction is not associated with the database object in the hash table.

19. The method of claim 18, further comprising:
receiving a list of transaction codes for transactions that caused a drain request to wait; and
associating the transaction codes with the database object in an object/transaction cross-reference table.

20. A computer system comprising:
a database subsystem;
at least one database client program;
at least one processor; and
memory storing instructions that, when executed by the at least one processor, cause the computer system to perform operations including:
    sending, from an outage engine, a database outage registration message to at least one database client program, the database outage registration message identifying a database object subject to the outage,
    receiving, at the outage engine, a lead time from the at least one database client program,
    sending an outage start message to the database client program when a drain request is expected within the lead time, the outage start message causing an intercept engine for the database client program to begin intelligently suspending transactions,
    initiating a drain for the database object, and
    sending a drain complete message to the database client program when the drain is complete, the drain complete message causing the intercept engine to release the suspended transactions.

21. The computer system of claim 20, the memory storing instructions that, when executed by the at least one processor, cause the computer system to further perform operations comprising:
    determining that at least one transaction is running after a drain start request; and
    sending a transaction code for the transaction to the at least one intercept engine,
    wherein the intercept engine associates the transaction code with the database object.

22. The computer system of claim 20, wherein the at least one intercept engine suspends the transactions prior to assignment to a connection thread for the database subsystem.

* * * * *